US011710075B2

(12) United States Patent
Shah et al.

(10) Patent No.: US 11,710,075 B2
(45) Date of Patent: Jul. 25, 2023

(54) HAZARD RECOGNITION

(71) Applicant: BARDAVON HEALTH DIGITAL, INC., Overland Park, KS (US)

(72) Inventors: Manish Shah, San Francisco, CA (US); Jeffrey Greenberg, San Francisco, CA (US); Evan Minamoto, Emeryville, CA (US); Navin Gupta, San Francisco, CA (US); Paolo Tagliani, Gavardo (IT); Francisco Jose Montiel Navarro, Malaga (ES)

(73) Assignee: Bardavon Health Digitial, Inc., Overland Park, KS (US)

( * ) Notice: Subject to any disclaimer, the term of this patent is extended or adjusted under 35 U.S.C. 154(b) by 0 days.

(21) Appl. No.: 17/396,499

(22) Filed: Aug. 6, 2021

(65) Prior Publication Data
US 2021/0365685 A1   Nov. 25, 2021

Related U.S. Application Data

(63) Continuation of application No. 16/385,559, filed on Apr. 16, 2019, now Pat. No. 11,093,747.
(Continued)

(51) Int. Cl.
*G06K 9/00* (2022.01)
*G06N 20/00* (2019.01)
(Continued)

(52) U.S. Cl.
CPC ........... *G06N 20/00* (2019.01); *G06F 3/0482* (2013.01); *G06F 18/214* (2023.01); *G06F 18/24* (2023.01);
(Continued)

(58) Field of Classification Search
CPC .. G06K 9/00771; G06K 9/629; G06K 9/6293; G06K 9/6262; G06K 9/00288;
(Continued)

(56) References Cited

U.S. PATENT DOCUMENTS

2006/0215904 A1  9/2006 Ibrahim et al.
2008/0243539 A1  10/2008 Barish et al.
(Continued)

OTHER PUBLICATIONS

Zhang, "Wildland Forest Fire Detection Based on Faster R-CNN using Synthetic Smoke Images," Feb. 2018, Elsevier (Year:2018).

*Primary Examiner* — Alex Kok S Liew
(74) *Attorney, Agent, or Firm* — Lathrop GPM LLP; Ricardo Ochoa

(57) ABSTRACT

Methods, systems, and devices are provided for identifying hazards. According to one aspect, a computer-implemented method can include receiving a plurality of sensor data including one or more image files from a mobile device. The method can include generating one or more position and label pairs based on the plurality of sensor data. The method can include assigning a hazard recognition to each of the position and label pairs. The method can include assigning a score associated to each of the hazard recognitions. The method can include displaying a result including one or more image results based on the one or more image files, one or more hazard recognitions, the one or more hazard recognitions associated with at least one of the one or more image results, and one or more scores associated to each of the hazard recognitions.

23 Claims, 6 Drawing Sheets

Related U.S. Application Data

(60) Provisional application No. 62/658,299, filed on Apr. 16, 2018.

(51) Int. Cl.
| | |
|---|---|
| *G06F 3/0482* | (2013.01) |
| *G06T 7/70* | (2017.01) |
| *G06T 7/00* | (2017.01) |
| *G06V 20/20* | (2022.01) |
| *G06V 20/40* | (2022.01) |
| *G06F 18/24* | (2023.01) |
| *G06F 18/40* | (2023.01) |
| *G06F 18/214* | (2023.01) |
| *G06V 20/52* | (2022.01) |

(52) U.S. Cl.
CPC ............ *G06F 18/40* (2023.01); *G06T 7/0002* (2013.01); *G06T 7/70* (2017.01); *G06V 20/20* (2022.01); *G06V 20/41* (2022.01); *G06V 20/52* (2022.01); *G06T 2207/10016* (2013.01); *G06T 2207/20081* (2013.01); *G06V 2201/10* (2022.01)

(58) Field of Classification Search
CPC .. G06K 9/0063; G06K 9/6211; G06K 9/6256; G06K 9/6282; G06K 9/00221; G06K 9/00362; G06K 9/4642; G06K 9/6215; G06K 9/626; G06K 2009/00738; G06K 2209/051; G06K 9/00718; G06K 9/00758; G06K 9/00778; G06K 9/00785; G06K 9/3233; G06K 9/6202; G06K 9/6218; G06K 9/6264; G06K 9/627; G06K 9/6292; G08B 17/125; G08B 13/19641; G08B 13/19656; G08B 13/19663; G06F 16/5838; G06F 16/5854; G06F 21/32; G06F 16/5862; G06F 16/783; G06F 19/321; G06F 19/3418
See application file for complete search history.

(56) References Cited

U.S. PATENT DOCUMENTS

| | | |
|---|---|---|
| 2013/0226667 A1 | 8/2013 | Terrazas et al. |
| 2014/0132409 A1 | 5/2014 | Billman et al. |
| 2015/0030203 A1 | 1/2015 | Kim et al. |

HAZARD RECOGNITION

CROSS-REFERENCE TO RELATED APPLICATIONS

This application is a continuation of U.S. application Ser. No. 16/385,559, filed Apr. 16, 2019, which claims the benefit of U.S. Provisional Patent Application No. 62/658,299, filed Apr. 16, 2018, which is hereby incorporated by reference in its entirety.

BACKGROUND

Currently, the detection and recognition of potentially dangerous hazards around a home or a building requires a complex system of sensors, involving, for example, a network of cameras and computer systems. The systems either require complex and slow algorithms for determining potential hazards, a significant amount of manpower to manually analyze video to determine hazardous conditions, or physically assessing hazardous conditions of a person's home.

It would be desirable to develop a simple computer-implemented program that can detect and recognize hazardous conditions in a person's home more efficiently and cost effective. In cases where training data is used to train machine learning algorithms to make confident decisions, an optimized method of generating a robust data set is also desired.

BRIEF SUMMARY

The present disclosure relates generally to systems and methods for identifying hazards.

In one aspect, a computer-implemented method of identifying hazards can include receiving a plurality of sensor data including one or more image files from a mobile device. The method can include generating one or more position and label pairs based on the plurality of sensor data. The method can include assigning a hazard recognition to each of the position and label pairs. The method can include assigning a score associated to each of the hazard recognitions. The method can include displaying a result including one or more image results based on the one or more image files, one or more hazard recognitions, the one or more hazard recognitions associated with at least one of the one or more image results, and one or more scores associated to each of the hazard recognitions.

In one aspect, the sensor data described above can include video capture data from a video or imaging capture device, imaging angle from an accelerometer of the mobile device, user selected data, or a combination thereof.

In one aspect, the user selected data can be derived from selectable themes or categories on a mobile application. In another aspect, the mobile application can include a user interface configured to receive selections by the user and give recommendations, or recommended selections, or a combination thereof. In another aspect, the recommendations can be based on a detection of a minimum or maximum threshold based on a camera angle of the mobile device when the user is using the mobile application.

In one aspect, the label identifies a characteristic of an item, scene, path, condition, potential hazards, or a combination thereof. In one aspect, the position identifies a local position of an item, scene, path, condition, potential hazards, or a combination thereof. In another aspect, the local position can be identified based on an entire frame of an image generated by the sensor data. In another aspect, the local position can be identified based on a portion of an image associated to a bounding box or a segmented list of points within the image.

In one aspect, the method further includes applying a recognition filter to each pair of the one or more position and label pairs. The method further includes generating one or more filtered label and position pairs. In another aspect, applying the recognition filter to each pair of the one or more position and label pairs can include applying a hysteresis filtering. In another aspect, applying the recognition filter to each pair of the one or more position and label pairs can include context recognition filtering of a user based on a selected context provided by the user. In another aspect, the method can further include generating a virtual hazard recognition based on the generating of the one or more filtered label and position pairs.

In one aspect, assigning each is carried out by a computer system that can be trained according to a training data set. The training data can be created by a training method including receiving a plurality of video files from a crowd-sourcing platform. The method can include processing each video file into a set of image files. The method can include sending each image file of the set of image files into an image queue. The method can include processing the image queue including labelling each image file according to a hazard characterization each image file represents. And the method can include tagging each of the image files with one or more of the hazard characterizations.

In one aspect the hazard recognition can be assigned based on a user's personal data including age, health, vision, physical mobility, personal medical information and conditions, or a combination thereof. In another aspect, the method can further include associating one or more hazard recognitions and score of the hazard recognitions with a scene or space. In one aspect, the method can further include generating a hazard score based on an aggregate of each score of the hazard recognitions associated with the scene or space. In another aspect, the method can further include generating one or more corrective measures based on at least in part of the one or more scores associated with the hazard recognitions and displaying the one or more corrective measures on the mobile device.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

I. Exemplary Hazard Recognizer

Figure 1:
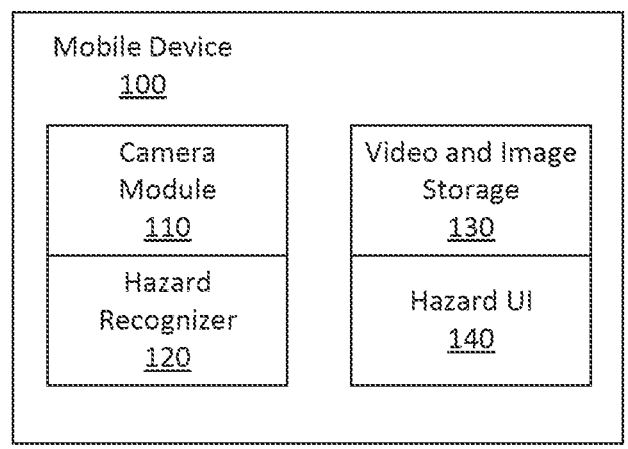
FIG. 1 is a schematic illustration of a computer system for identifying a hazard according to certain aspects of the present disclosure.

In this specification, reference is made in detail to specific embodiments of the invention. Some of the embodiments or their aspects are illustrated in the figures. For clarity in explanation, the system has been described with reference to specific embodiments, however it should be understood that the system is not limited to the described embodiments. On the contrary, the system covers alternatives, modifications, and equivalents as may be included within its scope as defined by any patent claims. The following embodiments of the system are set forth without any loss of generality to, and without imposing limitations on, the claimed method. In the following description, specific details are set forth in order to provide a thorough understanding of the present method. The present method may be practiced without some or all of these specific details. In addition, well known features may not have been described in detail to avoid unnecessarily obscuring the system.

In addition, it should be understood that steps of the exemplary system and method set forth in this exemplary patent can be performed in different orders than the order presented in this specification. Furthermore, some steps of the exemplary system and method may be performed in parallel rather than being performed sequentially.

A hazard detection system and method are provided for detecting hazards in a home or other building.

A. Exemplary System

The following specification describes a computer-implemented method and computer systems for detecting and identifying hazards. A hazard detection system utilizes a mobile device of a user to detect hazards in a home, apartment, dwelling, or other building. The mobile device may, for example, be a smartphone or tablet device having a camera, sensors, processor, memory, and wireless interface. The processing of a video captured by the camera can be processed onboard the mobile device itself or uploaded to a processing server via a wireless or wired connection.

In one example, the hazards may include potentially dangerous hazards or conditions related to factors that increase the chance of a person to sustain an injury. For example, a person may trip or fall in their residence due to obstacles that the person may trip over but is not aware of. An example can include home clutter, including piles of clothes or unorganized items on the ground, loose rugs, wires, and other obstacles. Other examples of hazards or hazardous conditions include detecting poor lighting conditions, obstructions to walkways or stairways, lack of bath mats to prevent slips, or other dangerous conditions can be included.

In one example, the hazard detection system is configured to detect the hazards and hazardous conditions mentioned above to prevent and educate people in condition to suffer from the hazards from injury. In one example, hazards may be detected for individual risk factors. However, combinations of factors may also be detected. For example, poor lighting may increase the likelihood of tripping over clutter, rugs, and wires.

In one example, an Artificial Intelligence ("AI") engine is trained to recognize and/or score hazards in a one or more still pictures of videos that a user takes of a place. The place can be that of the users dwelling in which the user likely spends part of her day, such as her home or residence. The place to detect hazards can also include any other buildings such as recreational buildings or workplace buildings. For the sake of simplicity in description, reference is made to "home hazards" but more generally, the AI engine could detect hazards in any building or room(s) that a user spends time in.

In one example, home hazards could be based off of Center for Disease Control (CDC) guidelines or other safety or health guidelines. The guideline set forth by the CDC can be a starting point for identifying the kind of obstacles or conditions that qualify as a hazard. In one example, a training data set is generated from a source dataset, which in one implementation is a library of videos and images of homes that are labeled as containing 1+(one or more) hazard or no hazard (for example, based on CDC guidelines). A tooling may be provided to aid in manipulating source images and videos and applying one or more labels about its hazards.

In one example, an AI model is trained, based on the training data, to recognize hazards in real-time using video and image captures from a smartphone camera. This AI model can be used to provide an end-user application. In one example, the end-user application holds the AI model and allows the user to know what is hazardous in their own home, including a summary of recognized hazards. This may include detecting hazards and/or scoring hazards (on an individual or collective basis). For example, an individual potential hazard may be scored on a scoring scale (e.g., 1 to 10) as a measure of the hazard. However, a set of potential hazards may be scored to provide an overall measure of the safety of an individual room, collection of rooms, or building. Recommendations may also be provided, such as a ranked list of corrective measures (e.g., install no-slip mat in bathtub, increase lighting in hallway). In one embodiment, a sharable summary of the hazards or hazard scores can be sent to relevant care providers for intervention.

While the AI engine may detect hazards based on the camera in a smartphone, more generally, the AI model may use any sensor in the smartphone. This may include, for example, sound (via a microphone) or augmented reality capabilities added by a smartphone OS. While a single hazard may be detected in a single frame, more generally multiple hazards may be detected in a single frame.

In some example implementations of the invention, single or multiple hazards may be outlined in real time on a video displayed on a user's mobile device for the user to see the hazard(s). For example, single or multiple hazards may be identified with bounding boxes around the hazards or may be identified with semantic segmentation, where individual pixels may be classified as hazardous or non-hazardous and by identity. As an illustrative example, a smartphone or other mobile device may have an AI hazard recognizer, as illustrated below.

1. Exemplary Hazard Recognizer

The following describes a system architecture configured to identify a hazard according to one aspect of the invention.

FIG. 1 illustrates an exemplary schematic diagram of a system architecture for a hazard detector. As illustrated in FIG. 1, a mobile device 100 is provided. The mobile device 100 can be any kind of mobile device such as a smartphone. The mobile device can include a camera module 110 which includes electrical components of a camera system embedded in the mobile device 100. The mobile device 100 can also include a video and image storage 130. In one example, the video and image storage 130 can be a memory or storage of a mobile device 100 that can store data files such as video files and image files captured by the camera module 110. The mobile device 100 can also include a hazard recognizer 120, or hazard recognizer program, and a hazard user interface 140 ("hazard UI 140").

For example, a user who owns a mobile device like that of mobile device 100 can download the hazard recognizer 120 to her mobile device. The hazard recognizer 120 may be implemented as an application that runs on a user's smartphone or other wireless device. The user may then use the camera module 110 on the mobile device 100 to take still or video images of her residence, home, apartment, or other dwelling they spend time. An indication of a hazard risk may be displayed on the UI of the user's smartphone or other mobile device via the hazard UI 140, such as a graphical display or audio indicating a risk score (or set of scores), identification of particular risks, and in some embodiments illustrates potential action items. The wireless interface of the mobile device 100 may also be used to transmit a summary of the hazard information.

Figure 2:
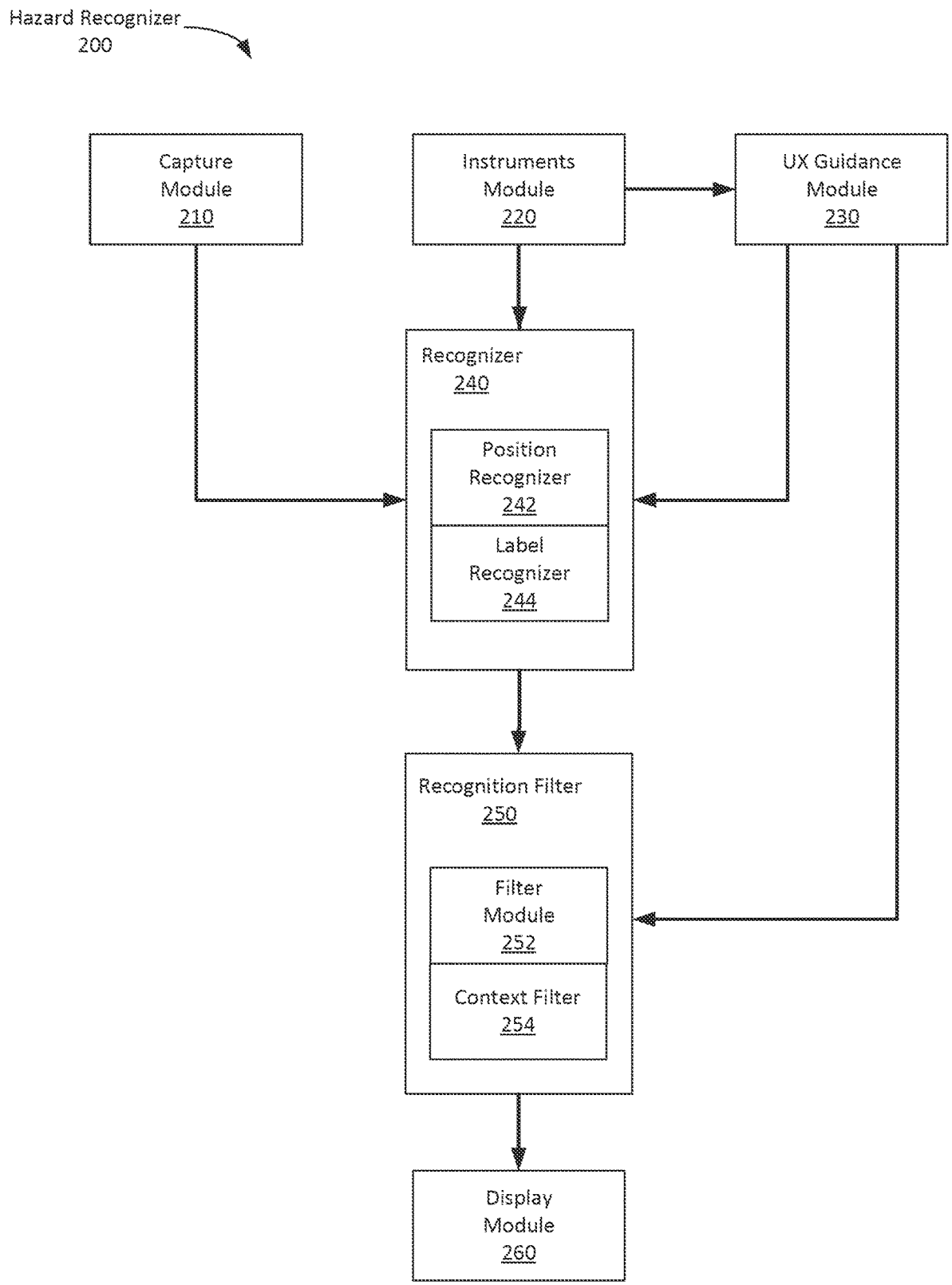
FIG. 2 is a schematic illustration of a computer system for identifying a hazard according to certain aspects of the present disclosure.

FIG. 2 illustrates an example system architecture of a hazard recognizer 200, similar to that of the hazard recognizer described in FIG. 1. As illustrated in FIG. 2, hazard recognizer 200 includes a capture module 210, an instruments module 220, a UX guidance module 230, and a recognizer 240. The recognizer 240 includes a position recognizer 242 and a label recognizer 244. The hazard recognizer 200 also includes a recognition filter 250 including a filter module 252 and a context filter 254.

In this example, the capture module 210 can be a camera that captures video of a scene or an environment. The video captured by the capture module 210 can be sent to the recognizer 240. The instruments module 220 can include accelerometers to determine location, angle of device used to capture video, etc. The UX guidance module 230 is a user interface configured to receive sensor data and user input of a user of the hazard recognizer 200 and give real-time guidance back to the user. For example, the hazard recognizer 200 can detect that an optimal angle should be used when capturing a video for a particular purpose, such as taking video for clutter on a ground. UX guidance module 230 can recommend to the user to aim the mobile device including the capture module in a certain configuration, such as a flat configuration, to optimally capture objects and conditions of a scene in the video. The UX guidance module 230 can advise the user as to where to point camera, and if the camera is pointed to high or low. The UX guidance module 230 can also determine if camera is moving too quickly to provide useful images i.e. reduce image blurring), and provide signals to the use to adjust their camera behavior accordingly. The UX guidance module 230 is also the interface for a user to select characteristics or themes of the scene to be captured. The selection, while optional, can help the hazard recognizer, at the recognizer 240 stage more accurately determine the scene and potential hazards. For example, if a user selects bathroom, the hazard recognizer 200 will be preconfigured to detect objects and conditions likely to exist in a bathroom setting.

The recognizer 240 is a machine learning module that takes various sensor data from the device (video stream, accelerometer stream, user interface state, and user data), such as the capture module 210, instruments module 220 and selection information from the UX guidance module 230, and generates a recognition based on the images received and the supplemental data from the instruments and selection information. A recognition may comprise a concatenation of the input information together with a sequence of label and position indicator. For example, the position and label pair can be generated by the position recognizer 242 and label recognizer 244. The label can identify an item in the image, and the position indication describes the items location and may range from the entire frame, to a bounding box or segmented list of points within the frame more specifically containing the item. In an embodiment, labels and positions are emitted with confidence levels indicating the amount of confidence that the recognizer 240 has in the output.

The recognizer filter 250 receives the emitted stream of recognitions and applies a variety of filters to it including a filter module 252 and a context filter 254. For example, at the filter module 252, the filter module 252 can apply recognition hysteresis filtering to dampen recognition jitter. This process can include:
1. Compute recognition time;
2. Compute recognition rate (recognitions/second)
3. Define a recognition counter "C" initialized at zero.
4. Define N contiguous label recognitions as a "HIT". In this case, N is a recognition and a function of the recognitions model's accuracy. If a recognitions' label is the same as the prior recognitions' label, then the counter C is incremented by a level. If N is reached, the recognition is characterized as a HIT. If the characterization is not the same as the prior characterization, the counter C is reset to zero.
5. Pass each HIT characterization to the next stage.

At the next stage at context filter 254 of the recognition filter 250, context of the image is used to eliminate or transform labels from a stream of HITS. For example, if the context selected by the user in the UX guidance module 230 is "bedroom", or if the hazard recognizer 200 already detects a "bedroom", labels having to do with a different context, such as "stairs" are removed from the HIT stream.

In one example, a filter is applied to incoming recognitions which can emit virtual recognition events, such as objects or conditions, for the case of events that are not present in the recognition stream. For instance, if grab bars are not found in the bathroom recognition context, and the hazard recognizer 200 determines that having no grab bars is a potentially hazardous activity, at least for the particular user, then a virtual grab bar hazard recognition is created and displayed to the user.

In one example, the filtered recognition stream of images is directed to a display module 260, or a display & storage module on and off the device. In one example, for each recognized hazard, images are selected to indicate the hazard to the user. Image selection is accomplished by looking through each of the contiguous HITS and for the image associated with highest label confidence value.

In one example, a hazard score can be computed and displayed once the recognition process through the recognition filter 250 is complete. There are varieties of methods computing this score. In one implementation, the hazard recognizer 200 can weigh each hazard-type by a severity and apply that weighting to the frequency of HITS of that hazard-type found. The hazard recognizer 200 can apply a function to aggregate each individual hazard value together with other values, where there may compounding effects, to yield a final single scalar value, scaled within a range, to indicate the degree of hazard this stream of hazards represents.

2. Training Architecture

In order to build the image recognizer to recognize hazards in the home, the machine learning system may train on a set of examples that represent specific hazards to determine patterns and contexts. Most image recognition systems train using widely accessible data sets such as ImageNet or others.

The following describes a case for training a data set when there is little to no publicly accessible data set of hazards to train the image recognizer. In one example, to build an accurate recognition machine learning model, source images representing the homes of real people and real users of the hazard recognizer is used. The machine learning model may comprise, for example, a neural network, convolutional neural network, recurrent neural network, support vector machine, linear regression, logistic regression, random forest, Bayesian decision tree, or other machine learning model.

Figure 3:
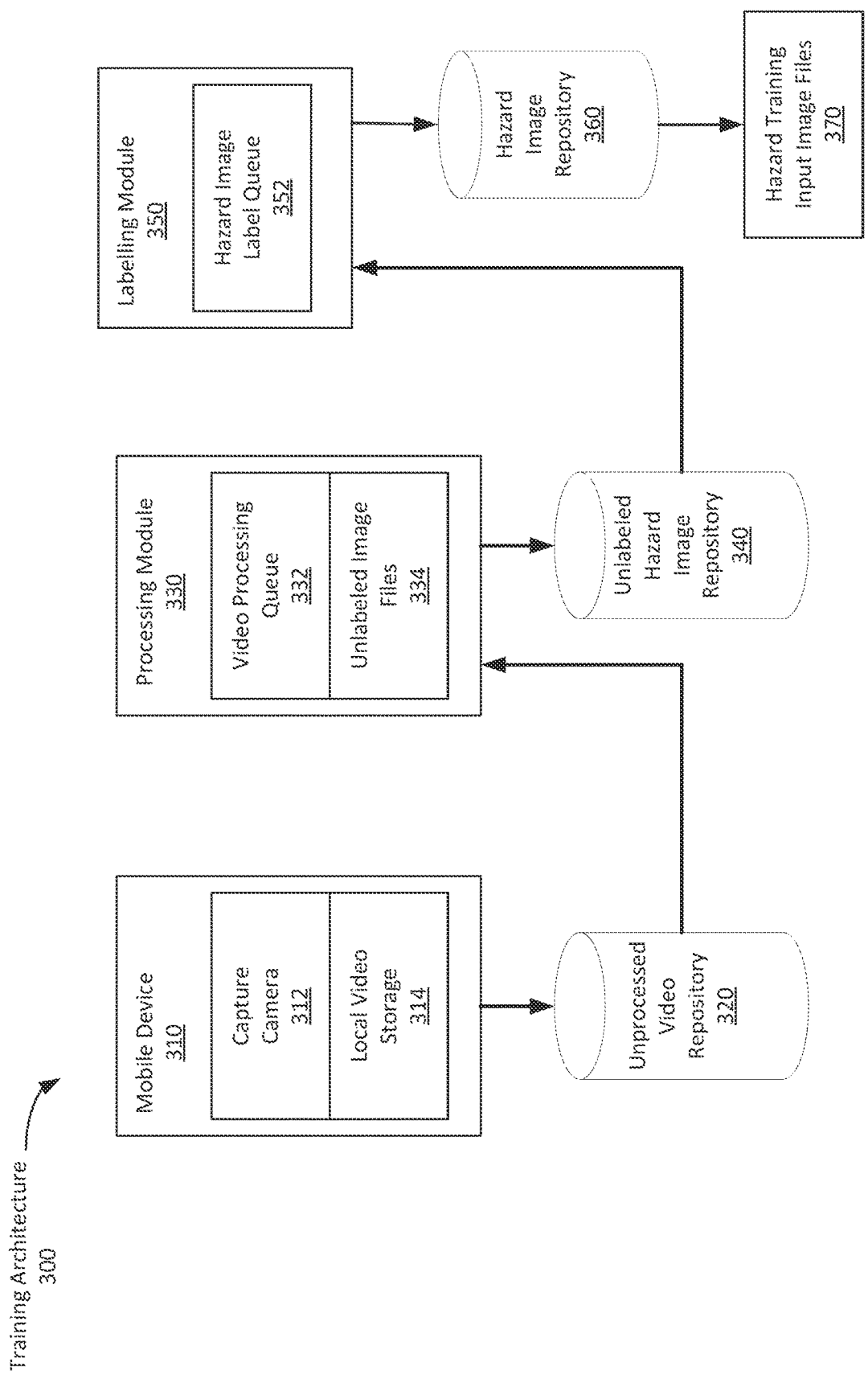
FIG. 3 is a schematic illustration of a computer system building a data set according to certain aspects of the present disclosure.

FIG. 3 illustrates an example training architecture 300 of building a training data set to supplement the hazard recognizer 200 to more accurately label, position, and determine hazard-type events, objects, and conditions.

In this example, training architecture 300 includes a mobile device 310 having a capture camera 312 and local video storage 314. In one example, the video data captured by the mobile device 310 is crowdsourced through various public forums. Instructions are streamlined and video requests can be tailored to request specific areas of a home, such as specific rooms. For example, a user having her own mobile device 310 can use a hazard recognizer application on her mobile device 310. Then the application is activated, the capture camera 312 can automatically turn on. The user can hit "record" and record a video of about 5-20 second length of a particular scene relevant to that of detecting hazards in a home. In one example, the person can be instructed by the application to record a video while shifting the camera around to record the area of the home from multiple angles. Optionally, accelerometer data may be measured to ensure that the person has actually collected video data from a full 360 degree, or other fully comprehensive, view.

In one example, the mobile device 310 can send captured videos stored in the local video storage 314 to an unprocessed video repository 320. The video files in the unprocessed video repository are uploaded to a processing module 330 to be processed by a human agent. In one example, at the video processing queue 332 of processing module 330, processing is done to determine if the video is appropriate, meaning if the video is actually a video of an area of a home that is of interest for the hazard recognizer. In addition, the orientation of the video can be updated to be the right point of view. For example, images extracted from the video can be adjusted or augmented, or both such that the images are flipped from about an axis (e.g. left to right). In this orientation, the hazard recognizer or training architecture can be trained on both orientations of images. In one example, the human agent receiving the images can then create mirrored or rotated version of the images so that the hazard recognizer can be trained to identify the hazard regardless of the detected hazard's orientation in space. Once a video is approved, and updated in orientation, the video is further manipulated in a series of still frames taken from the video and stored in an unlabeled images files 334 of the processing module. The still frames of the image files are then stored in an unlabeled hazard image repository 340.

Next, the unlabeled images or set of frames can then be added to another queue. In one example, the frames can be added to a hazard image label queue 352 of labelling module 350. In this example, a separate human agent can then process the frames in the hazard image label queue 352 to look at the image and determine which is the appropriate label to assign to the frame. For example, the label can be 1 of 25 different kinds of hazards that the hazard recognizer should recognize. In another example, many more types of hazards can be stored in the hazard recognizer. Or, the image could be labeled as containing no hazards or that the frame is too blurry to recognize as a hazard.

Next, the labelled images are stored in a hazard image repository 360 and uploaded to a hazard training input image files 370 to be added to a training set for the machine learning module to train. Once the labelling is completed, the frames or images are organized into the labelled state and stored in the hazard image repository.

B. User Experience Architecture

In an AI model, once a machine learning model has been sufficiently trained to recognize hazards in various home settings, it is ready to be inserted into an application that is downloaded to a person's smartphone device. Once on the device, it is then usable by a person to recognize specific hazards that the model has been trained to recognize, such as loose wires across a floor or rugs that need to be taped down. In some implementations, even when the model has been trained on thousands of hazard-type training images, there is still a probability of false positives (e.g. recognizing something as a hazard that is not a true hazard) and a probability of false negatives (e.g. not recognizing something as a hazard that is a true hazard). To reduce future false positives and false negatives, the system is able to collect additional feedback from real world use, such as manual selections, to improve itself.

For example, once a person has run the hazard recognition application and followed the steps of capturing a video, one or more images are recorded by the hazard recognition application. The application records specific hazards detected. In this case, each of the images with recognized hazards has a probability of being either a false positive or false negative. The person is able to specify if they believe the image is not a true hazard. The person is then able to upload the recognized hazard images to a separate repository of real world hazards. For example, the user can be first presented with snapshots of the hazards that were detected and presented the option to confirm or reject that the hazard or hazards detected are actually correct. The selection, acceptance, rejection, or further evaluation of the potential hazard or hazards detected can then be uploaded to the hazard recognizer so that it may be used, with further evaluation, to update the hazard recognizer. Further, agent can further assess whether the selections and evaluations of the potential hazards cover an issue presented by the hazards. The assessment can also be uploaded to the hazard recognizer so that it may be used to update the hazard recognizer on the issue and processed for subsequent recognitions as to whether a class of hazards has been fully addressed The images can then be processed with appropriate labels added to the images and the images are then added to the set of all training images to be used in the next model training iteration.

Figure 4:
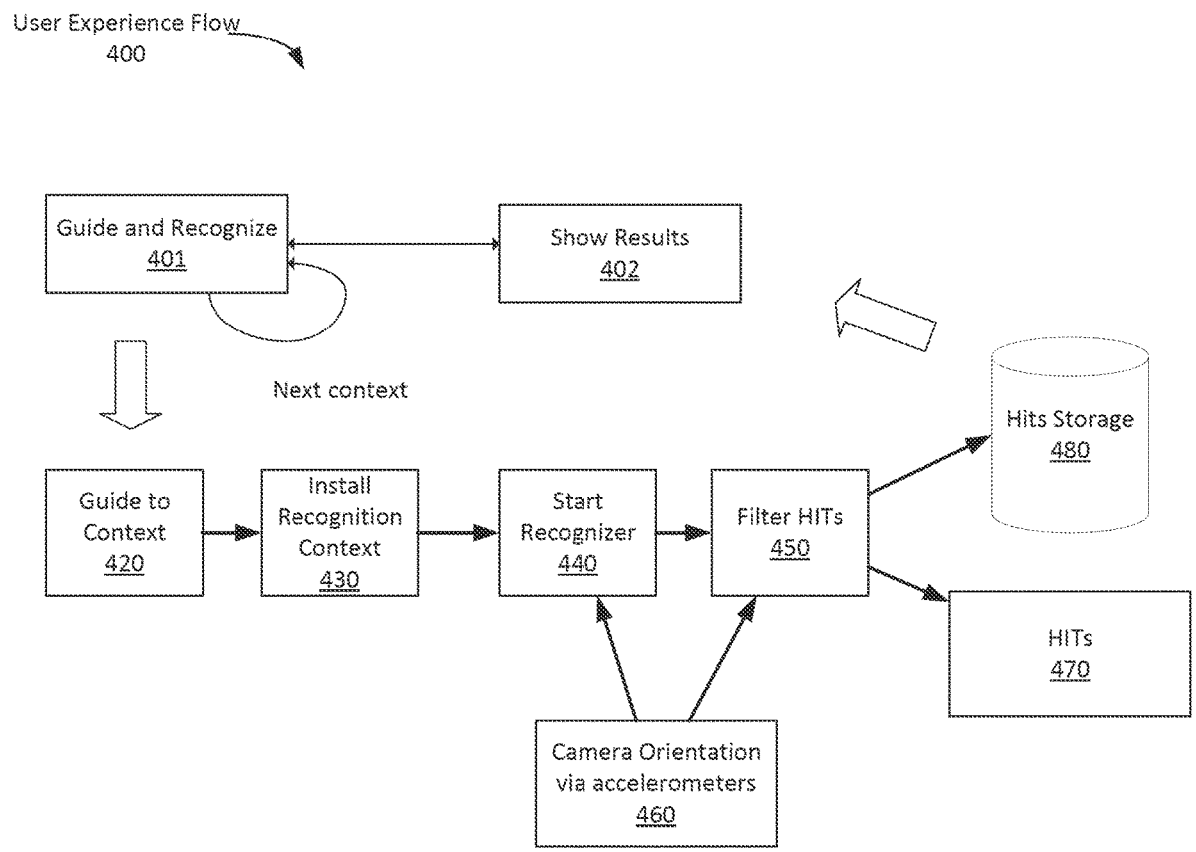
FIG. 4 is an additional schematic illustration of a computer system for identifying a hazard according to certain aspects of the present disclosure.

FIG. 4 illustrates a user experience flow 400. The user experience flow 400 includes two general steps, guide and recognize 401 and show results 402.

The guide and recognize step 401 comprises guiding the user to a recognition context and performing hazard recognition. At block 420, the UX guidance module 230 guides the user to a context. A context may comprise an understanding of the environment around the user, such as the type of room (e.g., bedroom, living room, bathroom, etc.) or type of building (e.g., home, office building, etc.) that the user is in. In one embodiment, the UX guidance module 430 guides the user sequentially through all the rooms of a home in order for the user to scan and thereby audit all rooms of the home for hazards. The UX guidance module 430 may do this by cycling through types of rooms, such as directing the user to visit the living room, then the master bedroom, then one or more guest rooms, then the kitchen, and so on. In an alternative approach, the UX guidance module 430 may direct the user to walk from each room to the neighboring rooms and ask the user to select the recognition context, such as but not limited to the identity of the room. In this way, the UX guidance module 430 may know ahead of time which context the user is in and tailor the recognizer 240 according to the recognition context.

At block 430, the UX guidance module 230 installs the appropriate recognition context 430 so that the recognition context is appropriately applied as a modifier to the recognizer 240. In one embodiment, separate recognizers 240 may be trained using data for different recognition contexts. In another embodiment, the recognizer 240 may accept as input the context in addition to the sensor input to output the HITS. In yet another embodiment, the same recognizer 240 may be used across multiple recognition contexts and the identity of the recognition context may be used as a filter to remove HITS that would not occur in the recognition context, such as stairs in a bathroom.

At block 440, the recognizer 240 is started to allow recognition of HITS. At block 460, camera orientation is measured via accelerometers or other sensors. The camera orientation may be input data for the recognizer 240 and may affect recognition results. At block 450, the HITS are filtered, such as based on the recognition context or the camera orientation. For example, the probability that a HIT for stairs is returned may be higher when the camera orientation is up instead of pointing down at the floor. However, the probability that a HIT for a trip hazard is returned may be higher when the camera orientation is pointing down at the floor. At block 470, the HITS are generated. Moreover, at block 480, the HITS are stored. The HITS in HITS storage may be returned for display in one or more results interfaces (block 402).

Figure 5:
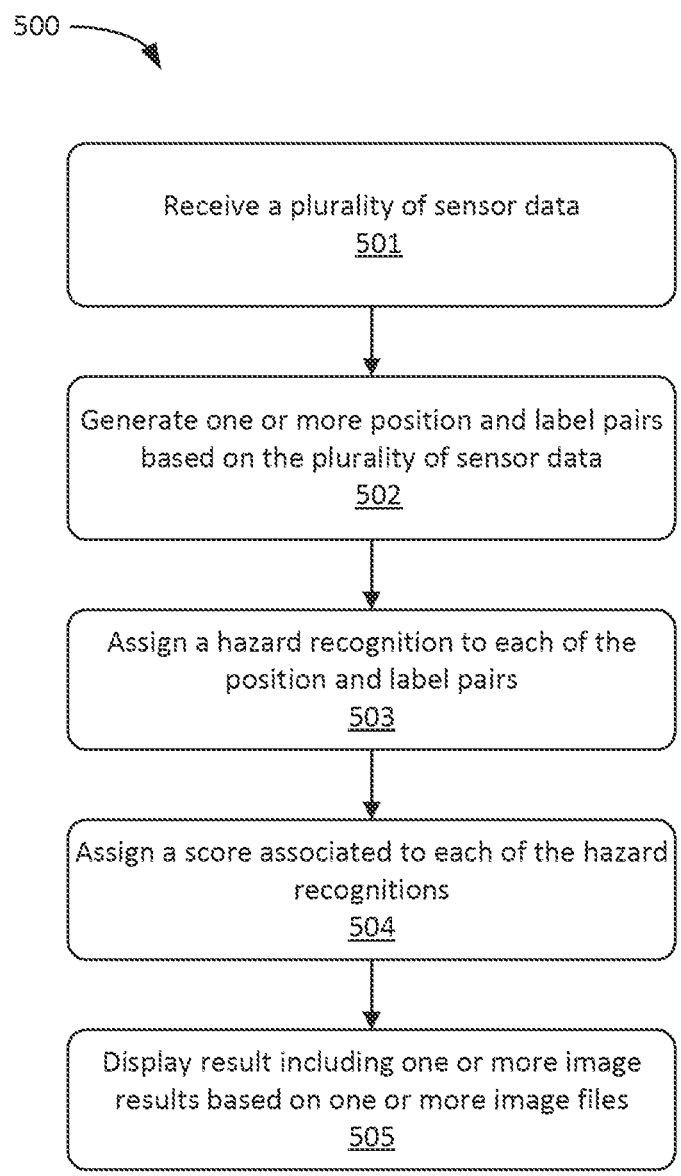
FIG. 5 illustrates a flow chart of an example process for identifying a hazard in accordance with various aspects of the present disclosure.

In the example flow diagram 500 of FIG. 5, at block 501, a hazard recognizer receives a plurality of sensor data. At block 502, the hazard recognizer generates one or more position and label pairs based on the plurality of sensor data. At block 503, the hazard recognizer assigns a hazard recognition to each of the position and label pairs. At block 504, the hazard recognizer assigns a score associated to each of the hazard recognitions. At block 505, the hazard recognizer displays a result including one or more image results based on one or more image files.

Figure 6:
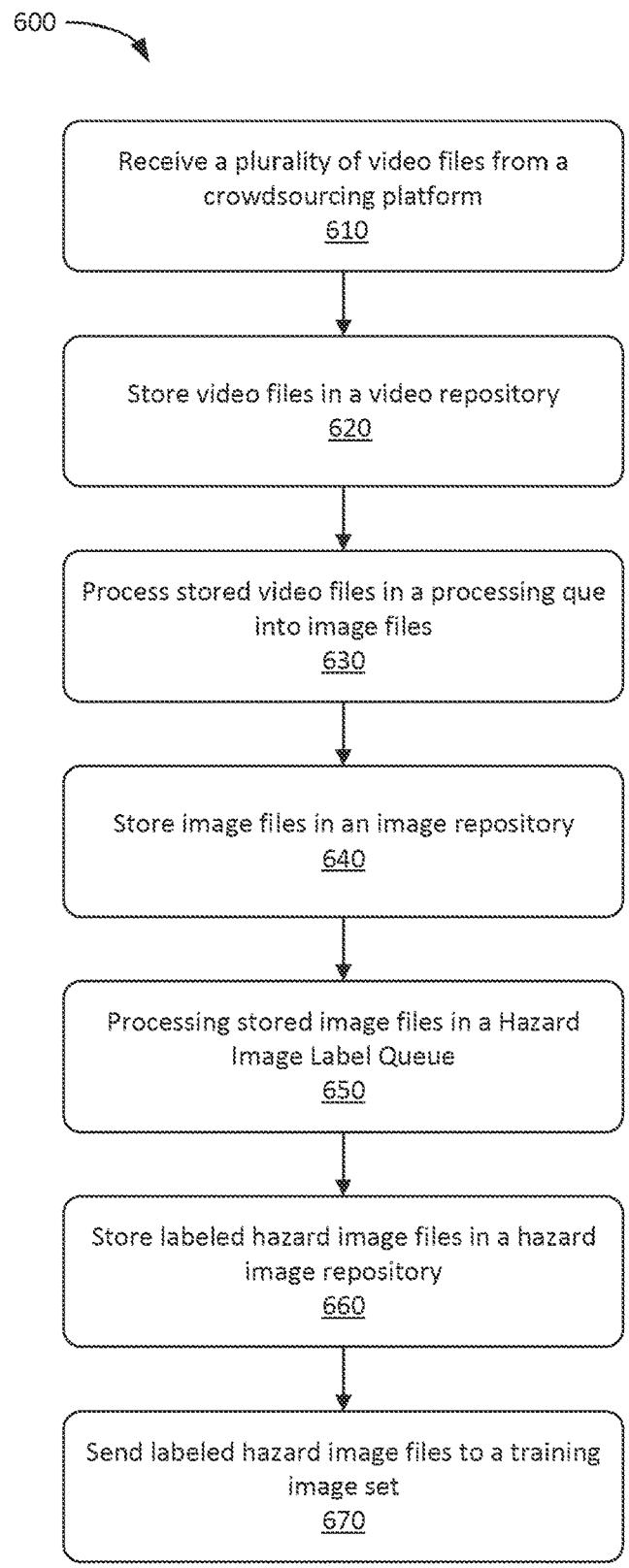
FIG. 6 illustrates a flow chart of an example process building a data set in accordance with various aspects of the present disclosure.

In the example flow diagram 600 of FIG. 6, at block 610, a hazard recognizer receives a plurality of video files from a crowdsourcing platform at block 620, a hazard recognizer stores video files in a video repository. At block 630, the hazard recognizer processes the stored video files in a processing queue into image files. At block 640, the hazard recognizer stores image files in an image repository. At block 650, the hazard recognizer processes stored image files in a Hazard Image Label Queue. At block 660, the hazard recognizer stores labeled hazard image files in a hazard image repository. At block 670, the hazard recognizer sends labeled hazard image files to a training image set.

C. Other Applications

In one example, the user interface can include a camera angle feedback module. In some implementations, tripping hazard issues are on the floor. To better capture data of the floor, the hazard recognizer may request a video aimed at the floor. To compel the user of the app to aim at the camera floor we, phone accelerometers can be used to detect the orientation of the phone with respect to the floor (via the gravity vector). With the angle of the camera thereby available, the user interface signals the user to aim the phone down. This signaling is done in real-time, either visually or via text-to-speech with the mobile device.

In another example, in order to maximize the AI recognition results, users are prompted to select various recognition contexts, for example, when guiding or recognizing hazards to be in the bathroom (aka bathroom recognition context), there is a unlikely chance that stairs will be found there, whereas bathroom fixtures like tubs and showers will more likely be present. The context can be selected by the user and applied to the recognition filter and used to filter the items recognized. In another example, a separate machine learning model can be used particularly for a context selected, thereby constraining the recognition results to the particular context.

The recognition filter and the recognizer can work in conjunction. During recognition in the recognizer, the recognition results are displayed in real-time on the screen as they are recognized. An alternative implementation is the recognition is not shown in real-time, and the user focus is solely on activity of scanning the camera about given the recognition context & camera angle feedback.

In one example, when all the recognition contexts have been performed by the user, the results are gathered and displayed with images of each HIT. Each Hazard is shown with a mitigation for that hazard, together with images that were obtained during the scan. For example, in a results image selection, the images shown are taken from each recognition HIT as the image with the highest recognition probability. Since a HIT is contiguous recognition across many frames, the HIT keeps track of the frame with the best recognition probability. The best recognition probability may comprise the highest confidence level returned by the hazard recognizer. That image is selected as the representative image for that HIT. In another example, for results image filtering, an enhancement to this selection is to remove HIT images that are similar to others for that hazard. For instance, to remove pictures of the same object that differ only by their angle in the image. In this example, results images (HITS) for a given hazard are passed through a different recognizer that processes images for similarity. Those images that whose similarity values are close are filtered to leave the one with the highest recognition probability.

In one example, the hazard recognizer also provides guidance to a user as to which pictures/videos to take, provides guidance for pictures/videos to take, etc. More generally, the hazard recognizer may also be programmed to provide guidance on hazard minimization. For example, an indication of hazards requiring immediate pro-active action may be generated.

Certain types of hazards are hazards to the general population. However, a user's age, health, and other factors could, in theory, also be considered in generating scores and/or identifying hazards. For example, a user of advanced age with brittle bones, poor physical balance or mobility, and poor vision may be at a higher risk of falling and have a greater risk of injury than average. These factors can be considered in defining a hazard or a hazardous condition. In another example, some types of medical conditions may be more likely, in statistical sense, to increase a risk of falling than others. These can also be factored in by the hazard recognizer.

User customization could be implemented in a variety of ways. In one approach, once a hazard is identified or scored it may be weighted by individual user medical or demographic data. For example, a user's medical information could be taken into account, such as information on a user's age, any medical conditions increasing the risk of a fall (e.g., brittle bones from osteoporosis), limitations on physical mobility (e.g., using a crutch or cane), and the users' vision (e.g., vision with/without glasses, and any limitations on peripheral vision or low-light (night) vision). This medical information could be used as a weighting factor in scoring or ranking risks.

Alternatively, if sufficient training data is accumulated, an AI engine could be trained to identify hazards of concern to people with particular medical or demographic parameters, such as identifying hazards for people with poor vision (e.g., poor peripheral vision or poor night vision, etc.). In some embodiments, separate AI engines are trained to recognize hazards for people with particular medical or demographic parameters. For example, separate AI engines are trained for elderly people, blind people, people with poor peripheral vision, and so on.

The AI Hazard detection may be used in a variety of end-use applications. As one example, it may be used by users to detect hazards in their home or dwelling place. This may be useful for injury avoidance for elderly people, people in poor health or at risk of falls, or people preparing for or recovering from surgery. Additionally, it will be understood that there may be other applications to improve the safety of buildings for the benefit of employees or members of the general public. For example, the hazard recognizer could have its training data modified to detect hazards in commercial buildings, hotels, restaurants, stores, etc. Thus, it will be understood that the AI Hazard Recognizer could be trained to a variety of environments.

In this specification, reference is made in detail to specific embodiments of the invention.

Some of the embodiments or their aspects are illustrated in the drawings.

For clarity in explanation, the invention has been described with reference to specific embodiments, however it should be understood that the invention is not limited to the described embodiments. The invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. The present invention may be practiced with different combinations of the features in each described configuration.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A system comprising one or more processors, and a non-transitory computer-readable medium including one or more sequences of instructions that, when executed by the one or more processors, cause the system to perform operations comprising:
    generating one or more position and label pairs based on a plurality of sensor data, the sensor data including one or more image files received from a mobile device;
    generating, via a trained artificial intelligence (AI) model, a hazard recognition to be assigned to each of the position and label pairs, the AI model trained based on a training data set based on a plurality of images of hazards labeled according to a plurality of hazard types;
    generating, via the trained AI model, a score to be associated with each of the hazard recognitions; and
    displaying a result comprising:
        one or more image results based on the one or more image files;
        one or more hazard recognitions, the one or more hazard recognitions associated with at least one of the one or more image results and a plurality of different hazard types; and
        one or more scores associated to each of the different hazard types of the hazard recognitions.

2. The system of claim 1, wherein the sensor data is comprised of video capture data from a video or imaging capture device, imaging angle from an accelerometer of the mobile device, user selected data, or a combination thereof.

3. The system of claim 2, wherein the user selected data are derived from selectable themes or categories on a mobile application.

4. The system of claim 3, wherein the mobile application comprises a user interface configured to receive selections by the user and give recommendations, or recommended selections, or a combination thereof.

5. The system of claim 4, wherein the recommendations are based on a detection of a minimum or maximum threshold based on a camera angle of the mobile device when the user is using the mobile application.

6. The system of claim 1, wherein the label identifies a characteristic of an item, scene, path, condition, potential hazards, or a combination thereof.

7. The system of claim 1, wherein the position identifies a local position of an item, scene, path, condition, potential hazards, or a combination thereof.

8. The system of claim 6, wherein the local position is identified based on an entire frame of an image generated by the sensor data.

9. The system of claim 6, wherein the local position is identified based on a portion of an image associated to a bounding box or a segmented list of points within the image.

10. The system of claim 1, further comprising the operations of:
applying a recognition filter to each pair of the one or more position and label pairs; and
generating one or more filtered label and position pairs.

11. The system of claim 9, wherein applying the recognition filter to each pair of the one or more position and label pairs comprises applying a hysteresis filtering.

12. The system of claim 9, wherein applying the recognition filter to each pair of the one or more position and label pairs comprises context recognition filtering of a user based on a selected context provided by the user.

13. The system of claim 9, further comprising: generating a virtual hazard recognition based on the generating of the one or more filtered label and position pairs.

14. The system of claim 1, wherein training the AI model comprises:
receiving a plurality of video files from a crowdsourcing platform;
processing each video file into a set of image files;
sending each image file of the set of image files into an image queue;
processing the image queue comprising labelling each image file according to a hazard characterization each image file represents; and
tagging each of the image files with one or more of the hazard characterizations.

15. The system of claim 1, wherein the hazard recognition is assigned based on a user's personal data including age, health, vision, physical mobility, personal medical information and conditions, or a combination thereof.

16. The system of claim 1, further comprising the operations of: associating one or more hazard recognitions and score of the hazard recognitions with a scene or space.

17. The system of claim 16, further comprising the operations of: generating a hazard score based on an aggregate of each score of the hazard recognitions associated with the scene or space.

18. The system of claim 1, further comprising:
generating one or more corrective measures based on at least part of the one or more scores associated with the hazard recognitions, and
displaying the one or more corrective measures on the mobile device.

19. The system of claim 1, further comprising: receiving a selection input from a human agent to determine whether a hazard classification based on one or more of the assigned hazard recognitions has been addressed.

20. The system of claim 1, further comprising:
receiving, via a server, one or more images from the mobile device;
detecting one or more hazards by processing the one or more images via a trained server-based AI hazard detection model; and
transmitting to the mobile device an indication of the detected one or more hazards.

21. The system of claim 1, further comprising:
labeling the detected one or more hazards; and
segmenting the one or more images according to the labeled hazard.

22. The system of claim 21, wherein the segmentation of the one or more images generates a graphical indication identifying a respective detected hazard.

23. The system of claim 21, further comprising training the AI model with the one or more images received from the mobile device and the labeled hazards.

* * * * *